(12) United States Patent
Butt

(10) Patent No.: US 7,270,049 B2
(45) Date of Patent: Sep. 18, 2007

(54) PERCOLATOR AND IMPROVED BREWING ASSEMBLY

(76) Inventor: Lawrence M. Butt, 75 Blueberry La., Northfield, NH (US) 03276

( * ) Notice: Subject to any disclaimer, the term of this patent is extended or adjusted under 35 U.S.C. 154(b) by 503 days.

(21) Appl. No.: 10/924,554

(22) Filed: Aug. 24, 2004

(65) Prior Publication Data

US 2006/0042471 A1 Mar. 2, 2006

(51) Int. Cl.
*A47J 31/00* (2006.01)
(52) U.S. Cl. .............. 99/292; 99/303; 99/306
(58) Field of Classification Search ........... 99/292, 99/293, 303, 308, 306
See application file for complete search history.

(56) References Cited

U.S. PATENT DOCUMENTS

| | | | | |
|---|---|---|---|---|
| 54,933 A | * | 5/1866 | Meigs | 99/303 |
| 95,056 A | * | 9/1869 | Holten | 99/303 |
| 555,500 A | * | 3/1896 | Denk | 99/303 |
| 1,774,927 A | * | 9/1930 | Lambert | 99/303 |
| 2,768,573 A | * | 10/1956 | Titus | 99/308 |
| 2,856,844 A | * | 10/1958 | Price | 99/299 |
| 2003/0205146 A1 | * | 11/2003 | Chang | 99/312 |

\* cited by examiner

*Primary Examiner*—Reginald L. Alexander
(74) *Attorney, Agent, or Firm*—Michael J. Persson; Lawson & Persson, P.C.

(57) ABSTRACT

An improved brewing assembly for a coffee percolator and a coffee percolator using the same. The brewing assembly includes a filter basket, a pump tube and a cover. The filter basket has an open top, a perforated bottom, an inner surface, and an outer surface. The pump tube is attached to the filter basket and engages the filter basket such that the pump tube is removed when the filter basket is removed. The cover has a top, a handle, and an open bottom defined by a sidewall. The sidewall of the cover includes both a means for engaging the container such that the cover remains attached to the container when the container is tipped to pour coffee through the pouring spout, and means for engaging the filter basket such that the brewing assembly remains attached to the cover when the cover is removed from the container after coffee is brewed.

20 Claims, 8 Drawing Sheets

PERCOLATOR AND IMPROVED BREWING ASSEMBLY

FIELD OF THE INVENTION

The present invention relates to percolators for making coffee and, in particular, to improved brewing assemblies for percolators and percolators utilizing the same.

BACKGROUND OF THE INVENTION

The percolator is one of the most familiar methods of brewing coffee. It works by filtering boiling water through the coffee grounds over and over. Many people still enjoy this old favorite, especially when it is used with very mild coffees.

A percolator is typically an inexpensive device that includes a hollow container having a handle and a spout, a cover, and a brewing assembly that includes a filter basket, a dripping basket that fits within the open top of the filter basket, and a substantially hollow pump tube that extends through the filter and dripping baskets and terminates near the bottom of the container. In operation, the user places the correct amount of water for the amount of coffee to be made into the container of the percolator, fills the filter basket with the correct amount of ground coffee, assembles the brewing assembly together and inserts the entire brewing assembly within the container of the percolator. The water within the container is then heated from its bottom, either by an integral heat source or an external one such as a stove or campfire, until the water in the bottom of the pot is brought to boiling, or nearly so. The heated water is forced up the pump tube to its top, where it is dispersed downward through the dripping basket and into the filter basket. Once in the filter basket, it flows through the coffee grounds, where it mixes with the coffee, and through perforations in the bottom of the filter basket and into the container, where it mixes with the water contained therein. This cycle is repeated, with each pass through the filter basket resulting in a stronger mixture of coffee in the container, until the resulting coffee is at a desired strength.

"In order to ensure that the wet grounds within the filter basket are not mixed with the brewed coffee during pouring, the entire brewing assembly, including the dripping basket, wet grounds, filter basket, and pump tube, must be removed before the coffee is poured. Unfortunately, because the components of the brewing assembly were in contact with boiling water, they will be extremely hot, requiring the user to use an oven mitt, potholder, towel or the like to insulate her fingers during removal. Because the brewing assembly is recessed within the container of the percolator, it is not easily removed therefrom. Further, the components of the brewing assembly are joined together only by the pump tube, which only extends a short distance from the top of the dripping basket in operation and is recessed even further when a spring is used to support the filter and dripping baskets. These factors make it difficult to securely grasp the brewing assembly during removal, which frequently results in the brewing assembly being dropped and the user being burned. Therefore, the users of conventional percolators must either wait until the brewing assembly has cooled sufficiently or risk being burned while removing it from the percolator."

The inventor is aware of four United States patents that include some means for making the removal of the filter assembly from a percolator safer. However, each has distinct disadvantages that make them impractical.

U.S. Pat. Nos. 3,282,196 and 3,323,441, which are related applications that are each titled "Coffee Percolator", describe improvements intended address the problem of sealing the components of a glass percolator during brewing of the coffee. This percolator includes a cover that has a pair of spring loaded fingers that extend downward to grasp pump tube and secure the brewing assembly within the open bottom of the cover, effectively preventing leakage of the coffee during brewing. Once the coffee is brewed, the cover and brewing assembly are removed as a single unit and are disassembled by depressing a button, which spreads the fingers engaged with the pump tube and releases the brewing assembly therefrom. When new, this system is effective at preventing the brewing assembly from being dropped. However, this system also has significant drawbacks.

First, because the spring-loaded fingers must engage the pump tube, the tube must be in close proximity the cover. This provides very little clearance for the passage of water and coffee, effectively reducing the rate at which water and coffee are allowed to pass through the grounds in the filter basket and vastly increasing the amount of time required to brew the coffee. Second, the spring loaded fingers are prone to fatigue and failure over time. Third, the button release used in this system is prone to inadvertent engagement, negating many of the safety benefits of such a system. Finally, the use of multiple mechanical parts to capture the filter assembly increases the complexity of the manufacturing and assembly processes that must be followed to produce the unit, which increases the overall cost of the percolator.

A similar system is described in U.S. Pat. Nos. 3,939,760 and 4,029,940, which are likewise related applications and are each titled "Percolator". Like the system discussed above, these patents are directed to percolators manufactured of glass and, in particular, are directed to the problem of preventing a glass cover from falling from the pot and breaking. To solve this problem, this percolator uses a pair of locking arms that extend from the side of the cover to engage slots in the pouring spout to retain the cover thereon during pouring. The percolators also use a set of spring-loaded fingers to grasp the pump tube and a button type mechanism to disengage the cover from the pump tube, in the same manner as described above. Accordingly, these percolators suffer from the same drawbacks inherent in the coffee percolators described in U.S. Pat. Nos. 3,282,196 and 3,323,441.

Therefore, there is a need for percolator and brewing assembly that allow the hot brewing assembly to be safely removed from a coffee percolator prior to pouring the coffee, that does not require significant changes to current processes of manufacturing percolators, that does not require multiple mechanical parts to operate, that does not require that the pump tube be placed in close proximity to the cover such that very little clearance is provided for the passage of water and coffee, that will not increase the amount of time required to brew the coffee, that is not prone to fatigue and failure over time, and that is not prone to inadvertent disengagement during removal of the brewing assembly.

SUMMARY OF THE INVENTION

The present invention is an improved brewing assembly for a coffee percolator and a coffee percolator using the same. In its most basic form, the brewing assembly includes a filter basket, a pump tube and a cover. The filter basket has an open top, a perforated bottom, an inner surface, and an outer surface. The pump tube is substantially hollow and is dimensioned to extend from a point proximate to the bottom of the container to a position above the filter basket. The pump tube is attached to the filter basket and engages the filter basket such that the pump tube is removed when the filter basket is removed from the container. The cover has a top, a handle extending from the top, and an open bottom defined by a sidewall. The sidewall of the cover includes both a means for engaging the container such that the cover remains attached to the container when the container is tipped to pour coffee through the pouring spout, and means for engaging the filter basket such that the brewing assembly remains attached to the cover when the cover is removed from the container after coffee is brewed.

In operation, the brewing assembly is disposed within the container and coffee is brewed in a conventional manner. However, when the coffee brewing cycle is completed, the user merely grasps the handle of the cover and removes the entire brewing assembly from the container by pulling it upward. The user then removes the cover from the brewing assembly and replaces it within the top opening of the percolator to allow the freshly brewed coffee to be poured.

In preferred embodiments of the brewing assembly, the filter basket includes at least one engaging detail disposed upon the outer surface thereof, which preferably takes the form of a ring annularly disposed about the filter basket. In these embodiments, the preferred means for engaging the filter basket includes at least one inward detent, and preferably two inward detents, extending inward from the sidewall of the cover and dimensioned to mate with and engage the mating detail of the filter basket. It is preferred that two inward detents be formed in opposing relation to one another and that the inward detents and mating ring be dimensioned such that the cover is disengaged from the filter basket by merely placing the pump tube on a surface and tilting the cover in an upward manner to release the filter basket and pump tube therefrom. However, other embodiments utilize a single detent that exerts an inward force upon the filter basket that acts to frictionally engage the cover and filter basket. Still other embodiments utilize a second annular ring disposed about the cover and adapted to mate with and frictionally engage the ring about the filter basket.

"The brewing assembly preferably includes a pump tube that that is fixedly attached to the filter basket to allow all of the components of the brewing assembly, to be removed as a single unit. However, other embodiments utilized a pump tube that is removably attached to the filter basket in order to allow the brewing assembly to be easily cleaned. In some embodiments, this is accomplished by attaching a bushing to the pump tube such that the bushing frictionally engages the central opening of the filter basket. In other embodiments, this is accomplished by forming an oblong portion into the pump tube such that the oblong portion frictionally engages the central opening of the filter basket."

The preferred brewing assembly also includes a dripping basket disposed within the open top of the filter basket. In some embodiments, the dripping basket engages the filter basket such that the filter basket is removed when the dripping basket is removed from the container, and cover includes means for engaging either the filter basket or the dripping basket such that the brewing assembly remains attached to the cover when the cover is removed from the container after coffee is brewed.

The present invention also includes a coffee percolator that utilizes the improved brewing assembly. The coffee percolator includes a container having a bottom, a top, an exterior surface, an interior surface for holding water and brewed coffee, a pouring spout in communication with the interior surface, and a top opening disposed through the top. The brewing assembly is removably disposed within the container and may take any of the forms described herein.

In the preferred embodiment, the container includes at least one first engaging detail disposed upon the interior surface proximate to the top opening, the filter basket includes at least one second engaging detail disposed upon the outer surface thereof, the means for engaging the container includes at least one outward detent extending outward from the sidewall of the cover and dimensioned to mate with and engage the first engaging detail of the container, and the means for engaging the dripping basket comprises at least one inward detent extending inward from the sidewall and dimensioned to mate with and engage the second mating detail of the filter basket. The first engaging detail is preferably a ring annularly disposed about the inside surface of the container, while the second engaging detail is preferably a ring annularly disposed about the outer surface of the filter basket. As was the case with brewing assembly, the preferred embodiment includes two inward detents disposed in substantially opposed relation upon the sidewall of the cover and dimensioned such that the cover is disengaged from the filter basket by merely placing the pump tube on a surface and tilting the cover.

Therefore, it is an object of the invention to provide a percolator and brewing assembly that allow the hot brewing assembly to be safely removed from a coffee percolator prior to pouring the coffee.

It is an aspect of the invention to provide a percolator and brewing assembly that does not require significant changes to current processes of manufacturing percolators.

It is a further aspect of the invention to provide a percolator and brewing assembly that does not require multiple mechanical parts to operate.

It is a further aspect of the invention to provide a percolator and brewing assembly that does not require that the pump tube be placed in close proximity to the cover such that very little clearance is provided for the passage of water and coffee.

It is a further aspect of the invention to provide a percolator and brewing assembly that will not increase the amount of time required to brew the coffee.

It is a further aspect of the invention to provide a percolator and brewing assembly that is not prone to fatigue and failure over time.

It is a still further aspect of the invention to provide a percolator and brewing assembly that is not prone to inadvertent disengagement during removal of the brewing assembly.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
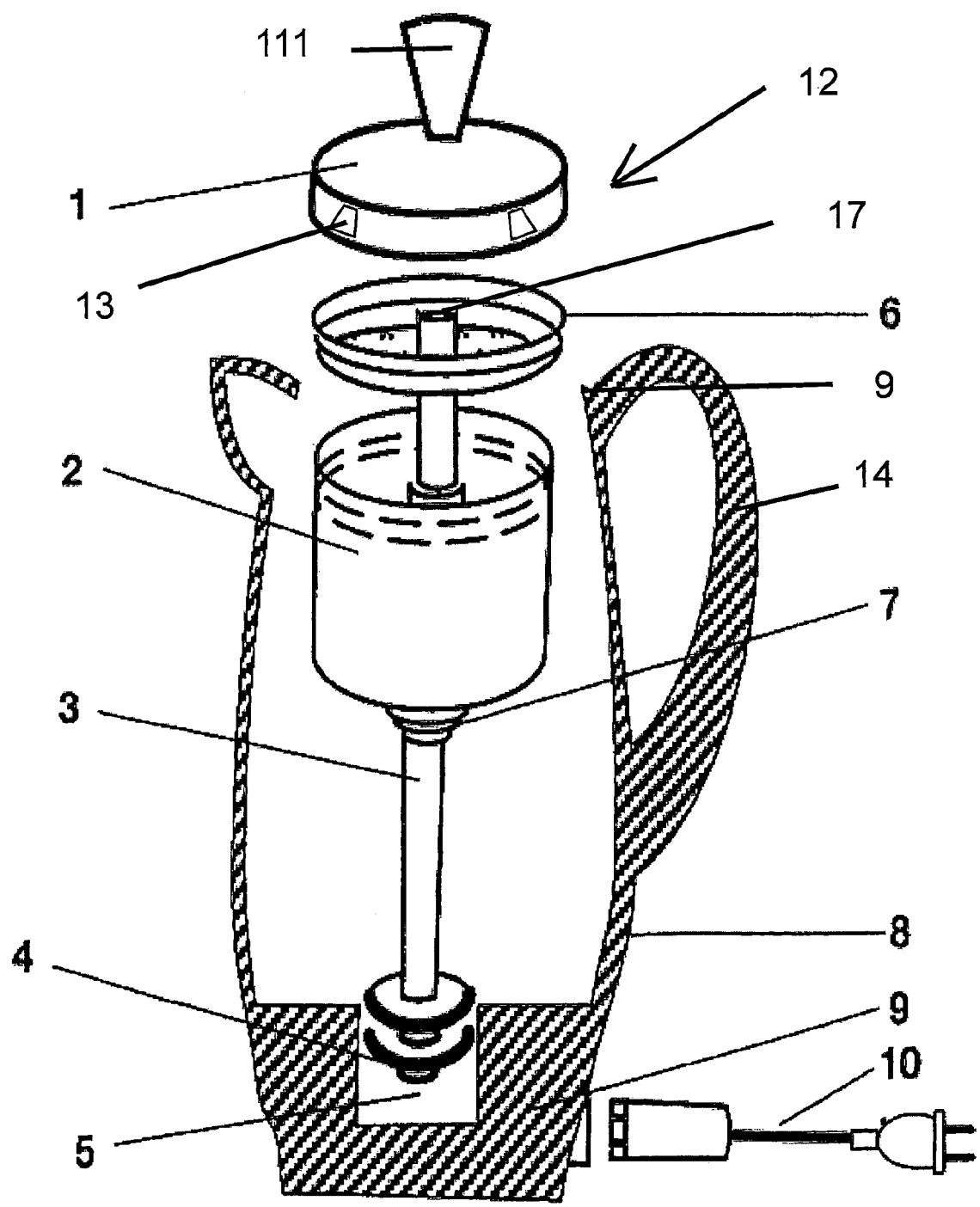
FIG. 1 is an assembly view of a prior art electric percolator with the container cut away to reveal the internal components thereof.

Referring first to FIG. 1, a conventional percolator 12 is shown. The conventional percolator 12 includes a hollow container 8 having a handle 14 and a spout 16 extending therefrom and an opening 18 through its top portion 20. The container 8 may be made from a number of different materials, such as cast iron, glass, ceramic or composite material, although the most common material in current production is stainless steel, A cover 1 having an insulating handle 11 is provided and is dimensioned to fit securely within the opening 18. The cover 1 includes am insulating handle 11 at its top and at least two outward detents 13 disposed about its periphery that frictionally engage the inner surface 9 of the container 8 to hold the cover in place during both brewing and pouring. The bottom portion 22 of the container 8 includes a base 9 within which is housed an electrical resistance heater (not shown) that is in electrical communication with the power cord 10. The heater surrounds the center well 5 of the base 9 and acts to heat the water and coffee that come in contact therewith. Finally, a brewing assembly 26 is removably disposed within the hollow container 8.

The brewing assembly 26 includes a filter basket 2, a dripping basket 6 that fits within the open top of the filter basket 2, and a substantially hollow pump tube 3. The pump tube 3 extends through the filter basket 2 and dripping basket 6, which are each held in position along the pump tube 3 by a spring 7. The spring 7 retains the baskets 2, 6 in place and pushes the filter basket 2 and dripping basket 6 upward against the cover 1 during brewing. The bottom end of the pump tube 3 terminates in the center well 5 of the base 9 and preferably includes a pair of washers 4 that fit closely about the center well 5 and cause the heated water/coffee within the well 5 to be forced upward through the pump tube 3, out the top opening 17 thereof, and into the dripping basket 6.

Figure 2:
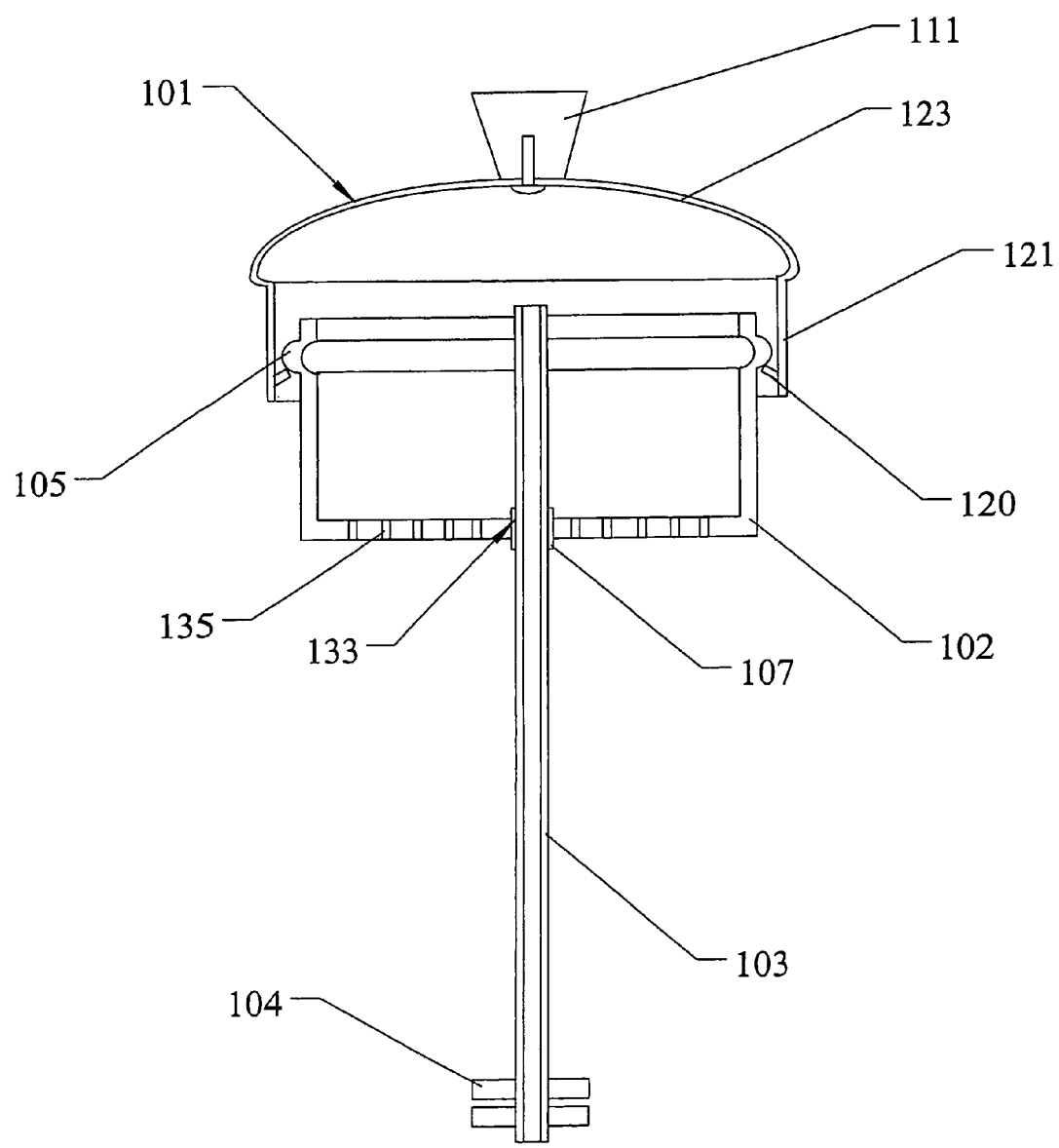
FIG. 2 is a cut away side view of the basic embodiment of the brewing assembly of the present invention.
Figure 4:
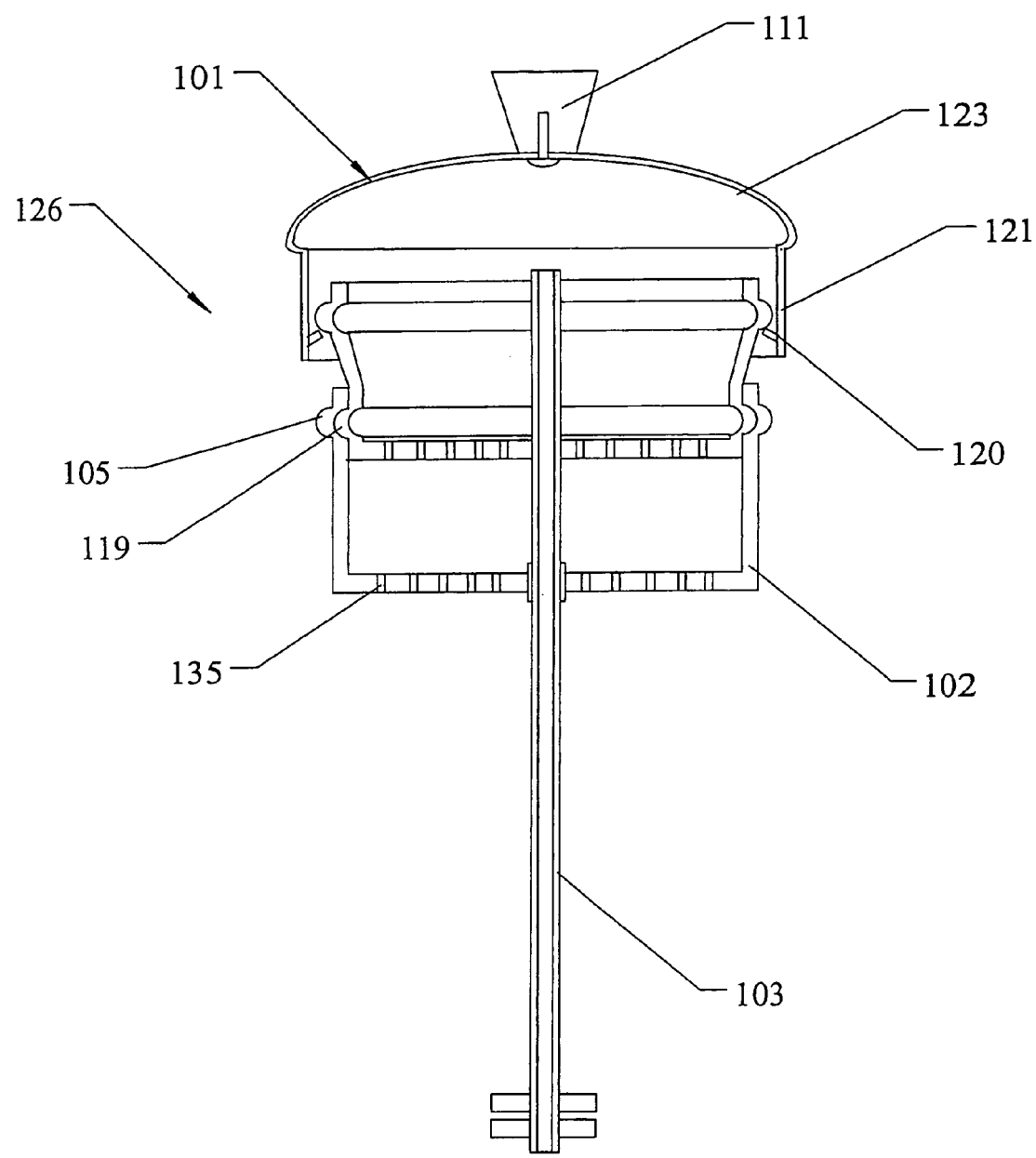
FIG. 4 is a cut away side view of the one embodiment of the brewing assembly in which a dripping basket is provided.

As shown in FIG. 2, the basic embodiment of the brewing assembly 126 used with the percolator 100 of the present invention is similar in all respects to the brewing assembly 26 of the conventional percolator 12 of FIG. 1 with three principal exceptions. First, the spring 7 is eliminated from the brewing assembly 126 and is replaced with means 107 for attaching the pump tube 103 to the filter basket 102 such that pump tube 103 is removed from the container when the filter basket 102 is removed therefrom. Second, in addition to the detents 13 that extend outward from the cover 1 to engage the sides of the container 8, the cover 101 of the brewing assembly 126 of the present invention includes means 120 for engaging the filter basket 102 such that the filter basket 102 remains attached to the cover 101 when the cover 101 is removed from the container after coffee is brewed. Third, the dripping basket 6 is eliminated in the basic embodiment although, as shown in FIG. 4, this basket 106 is included in other embodiments of the brewing assembly 126.

Figure 5:
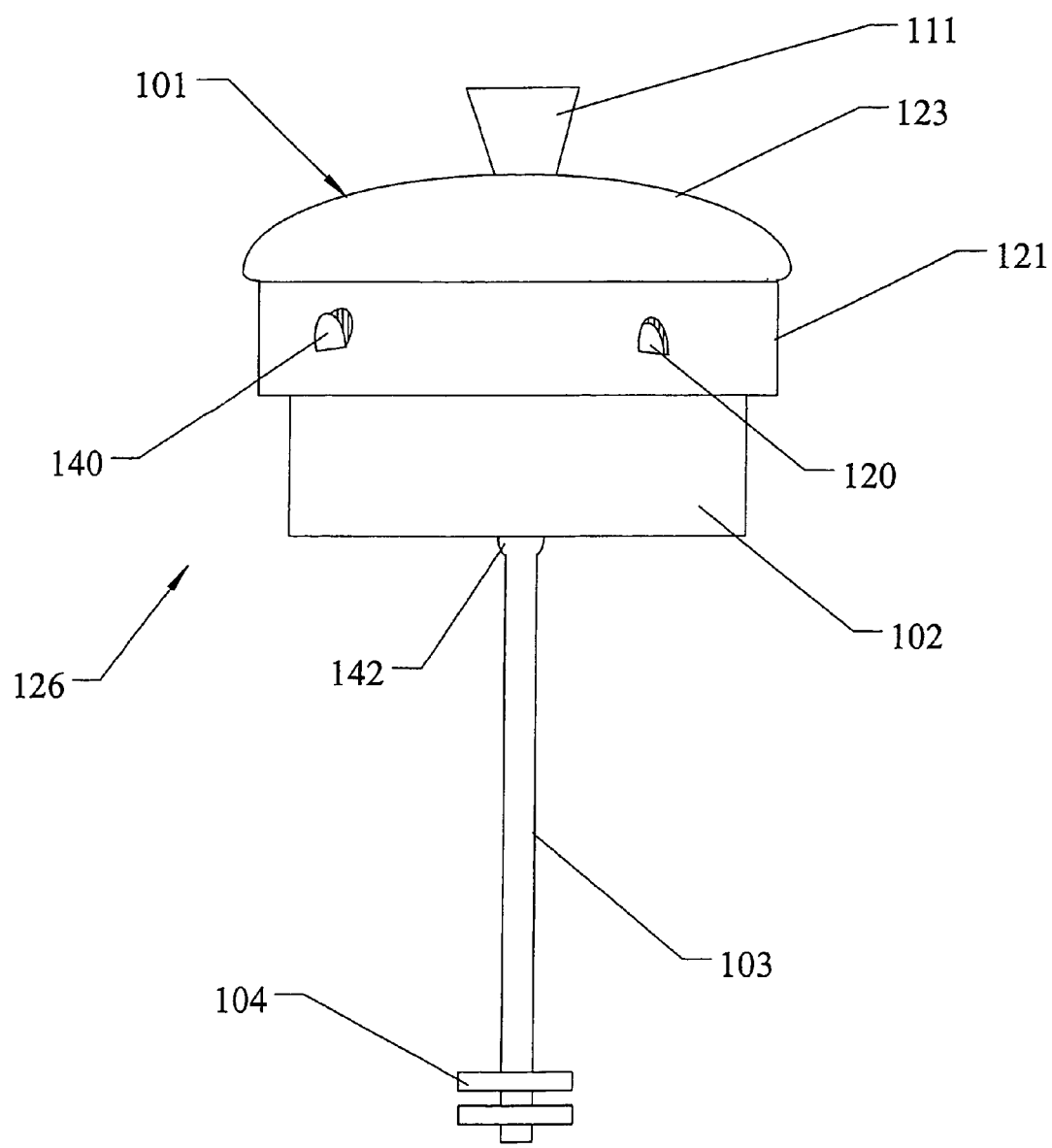
FIG. 5 is a side view of one embodiment of the brewing assembly with the cover attached to the filter basket.

As shown in FIG. 2, the means 107 for attaching the pump tube 103 to the filter basket 102 may be a bushing that is fixedly attached to the pump tube 103 at the desired location and is dimensioned to create a frictional fit with the central opening 103 within the filter basket 102. However, as shown in FIG. 5, the means 107 need not be a separate component, but rather may be an oblong portion 142 of the pump tube 103 that is deformed to have a non-circular cross section that frictionally engages the central opening 103 within the filter basket 102 in a manner similar to the bushing shown in FIG. 2. In other embodiments, the central opening 103 within the filter basket 102 is threaded and an externally threaded bushing is attached to the pump tube 103 and dimensioned to mate with the threaded central opening 103 of the filter basket 102. In still other embodiments, the means 107 may be a clip type fastener that is disposed upon the pump tube 103 and adapted to engage the filter basket 102. As is readily apparent from the foregoing, there are a number of art recognized means for attaching the pump tube 103 to the filter basket 102. Further, as noted above, it is preferred that the pump tube 103 be fixedly attached to the filter basket 102, which eliminates the need for such a means 107. Therefore, the present invention should not be limited to the particular embodiments described herein.

Figure 3:
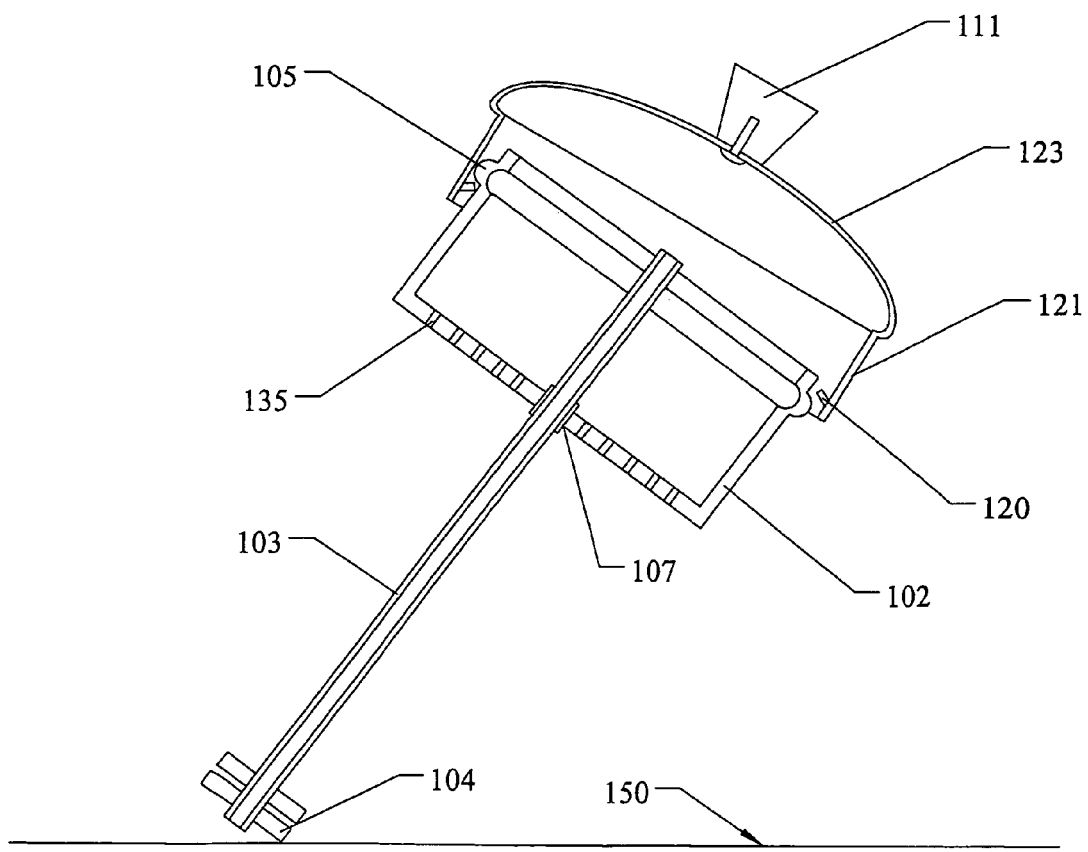
FIG. 3 is a cut away side view of the brewing assembly of FIG. 2 during disengagement from the percolator cover.

As also shown in FIG. 2, the preferred means 120 for engaging the filter basket 102 such that the filter basket 102 remains attached to the cover 101 are inward detents 120 that extend inward from the sidewall 121 of cover 101 to engage a groove 105 formed about the circumference of the filter basket 102. In the embodiment of in FIG. 2, the inward detents 120 are similar to the outward detents 140, shown in FIGS. 5 and 6, which extend outward from the sidewall 121 of the cover 101 to engage the interior surface 161 of the container 108. In fact, the inventor merely bent two of four detents 13 of the cover of his standard percolator inward to form the inward detents 120 in his prototype of the invention. The use of two inward detents 120 disposed in substantially opposing relation about the cover 101 is preferred as it allows the cover 101 to be easily removed by grasping only the insulated handle 111. As shown in FIG. 3, this is accomplished by dimensioning the cover 101, ring 105 and the two inward detents 120 such that the cover 101 may be disengaged from the filter basket 102 by placing the pump tube 103 on a surface 150 and tilting the brewing assembly 126 until one of the inward detents 120 disengages from the ring 105. Once this is accomplished, the cover 101 is lifted away, allowing the remaining parts of the brewing assembly 126 to come to rest on the surface 150.

Although the use of inward detents 120 is preferred, it is recognized that a number of different means 120 for engaging the filter basket 102 could also be used. For example, the sidewall 121 of the cover 101 may include two sets of slits that are disposed parallel to one another and pushed inward to form an engaging detail that frictionally engages the filter basket 102 in a manner similar to a leaf spring. In such an embodiment, the cover 101 could be easily disengaged by including mating details on the filter basket 102 that would affirmatively engage the engaging details when in one position and allow the cover to be removed by rotating the cover 101 such that the mating details are out of engagement therewith.

Figure 7:
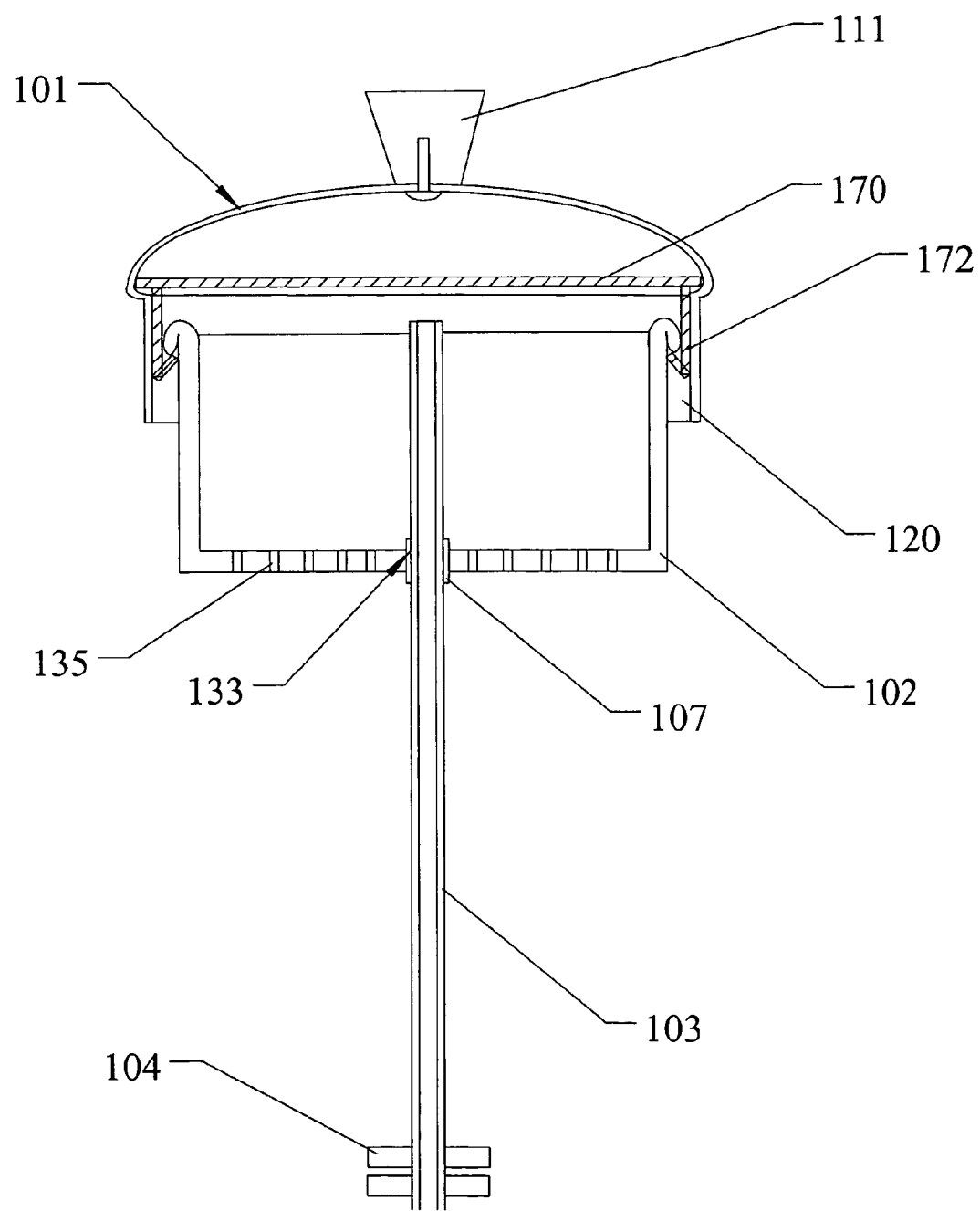
FIG. 7 is a cut away side view of an alternative embodiment of the brewing assembly in which the means for engaging the filter basket is a separate spring attached to the cover.

Finally, as shown in FIG. 7, the means 120 for engaging the filter basket 102 may be a separate spring 170 that is inserted within the cover. In this embodiment, the cover 101 may include all of the outward detents 13 discussed above, but also include a bent wire type spring 170 that is compressed to fit within the inside of the cover 101 and expands against the cover 101 when uncompressed. The spring 170 includes at least arms 172 that extend downward along the sidewall 121 and inward from the cover 101 and engage the engaging detail 105 of the filter basket 102. It is noted that, in the embodiment of FIG. 7, the engaging detail 105 is simply a lip formed by rolling over the top edge of the filter basket 102, although other such engaging details as described herein may be substituted to achieve similar results.

As shown in FIG. 4, the brewing assembly 126 may also include a dripping basket 106. In this embodiment, the dripping basket 106 engages the filter basket 102 via a ring 119 that frictionally engaging the ring 105 of the filter basket 102 such that the filter basket 102 is removed when the dripping basket 106 is removed from the container. The cover 101 is then placed over the dripping basket 106 such that the inward detents 120 engage the ring 119 of the dripping basket 106 in the same manner as described above with respect to the embodiment of FIG. 2. Although, this arrangement is shown, other embodiments utilizing dripping baskets 106 allow the dripping baskets 106 to sit loosely upon the filter basket 102, with the inward detents 120 of the cover 101 engaging the filter basket 102 rather than the dripping basket 106. Accordingly, the invention should not be seen as being so limited.

FIG. 5 shows one embodiment of the brewing assembly 126 with the cover 101 attached to the filter basket 102. In this embodiment, the sidewall 121 of the cover includes the preferred arrangement of outward detents 140 and inward detents 120, with each disposed in alternating relation about the sidewall 121 approximately 90° from the one another. However, it is recognized that additional detents 140, 120 may be added that the detents 140, 120 may be arranged in other relationships to achieve similar results.

Figure 6A:
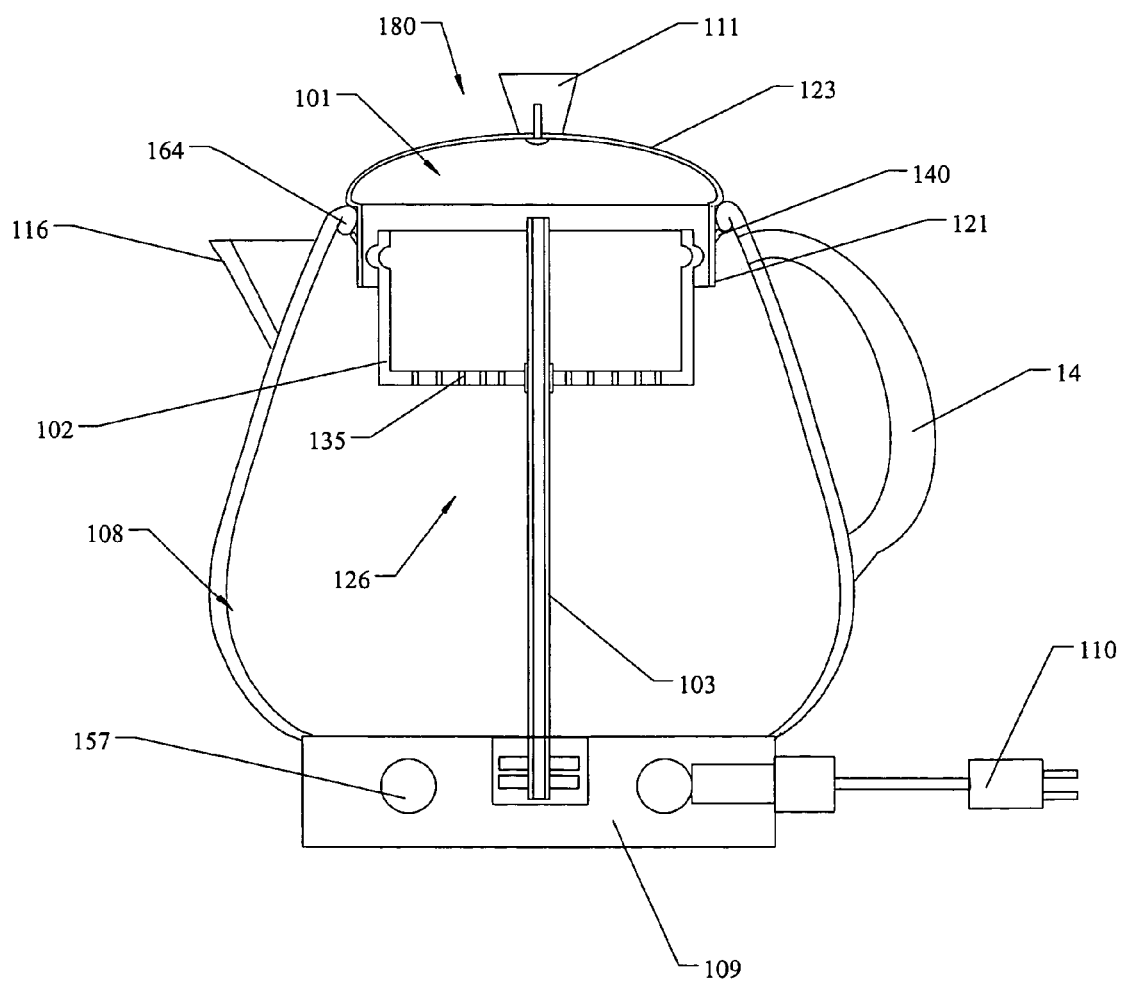
FIG. 6A is a cut away side view of one embodiment of the coffee percolator of the present invention with the cover attached to the container.
Figure 6B:
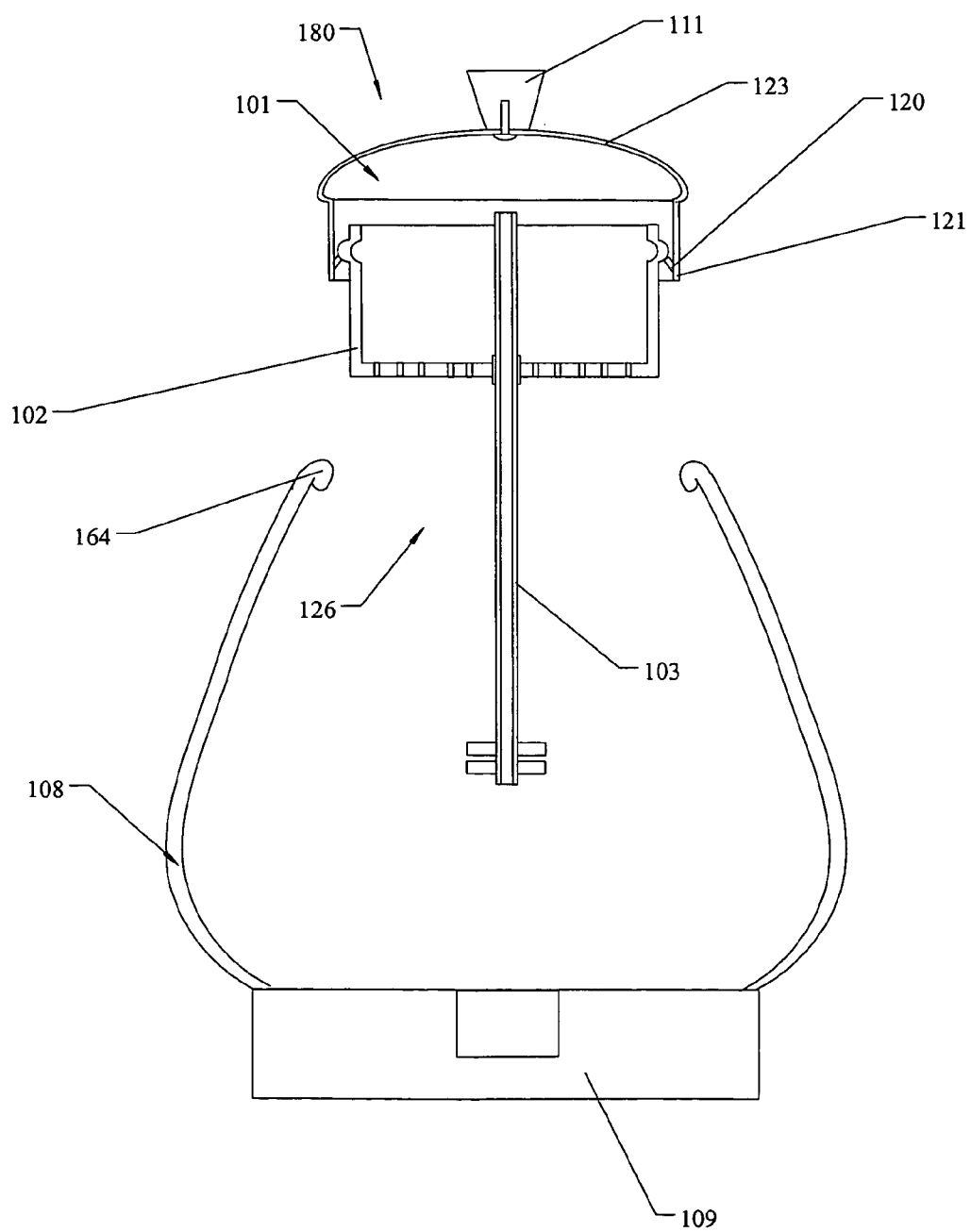
FIG. 6B is a cut away side view of the embodiment of FIG. 6A rotated ninety degrees to show the engagement between the cover and the filter basket when the brewing assembly is removed from the container.

"FIGS. 6A and 6B show the coffee percolator 180 of the present invention. The coffee percolator 180 includes a container 108 having a bottom 109, a top 162 forming an opening, an exterior surface 163, and an interior surface 161 for holding water and brewed coffee. A pouring spout 116 is in conmiunication with the interior surface 161, and a pouring handle 114 is provided along the opposite side of the exterior surface 163 for holding the container 108 during pouring. An electrical resistance heater 157 is disposed within the bottom of the container and is in electrical communication with a source of electricity, here an electrical plug 110. Finally, the brewing assembly 126 is removably disposed within the container 108."

"As shown in this embodiment, the top 162 of the container 108 is of a diameter that it slightly larger than the outer diameter of the sidewall 121 of the cover 101, but slightly smaller than the distance between the outward detents 140. In this manner the outward detents 140 act to hold the cover 101 onto the container 108. In other embodiments, however, the container 108 includes at least one first engaging detail 164 disposed upon the interior surface proximate to the top162. In containers manufactured of stainless steel or other sheet metals, it is preferred that this first engaging detail 164 merely be a rolled over portion of the stainless steel that forms a smooth lip. However, other embodiments of the container 108 may include engaging details 164 formed in other art recognized manners and, therefore, the first engaging detail 164 should not be seen as being so limited."

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A brewing assembly for a coffee percolator comprising a container having a bottom, a top, an exterior surface, an interior surface for holding water and brewed coffee, a pouring spout in communication with the interior surface, and a top opening disposed through the top, said brewing assembly comprising:
   a filter basket comprising an open top, a perforated bottom, an inner surface, an outer surface, and a ring annularly disposed about said outer surface;
   a substantially hollow pump tube attached to said filter basket and dimensioned to extend from a point proximate to the bottom of the container to a position above said filter basket, wherein said pump tube is attached to said filter basket such that said pump tube is removed when said filter basket is removed from the container; and
   a cover comprising a top, a handle extending from said top, and an open bottom defined by a sidewall, wherein said cover comprises means for engaging the container such that said cover remains attached to the container when said container is tipped to pour coffee through said pouring spout, and means for engaging said filter basket such that said brewing assembly remains attached to said cover when said cover is removed from the container after coffee is brewed;
   wherein said means for engaging said filter basket comprises two detents extending inward from said sidewall of said cover and dimensioned to mate with and engage said mating detail of said filter basket; and
   wherein said detents and said ring are each dimensioned such that said cover may be disengaged from said filter basket by placing said pump tube on a surface and tilting said cover.

2. The brewing assembly as claimed in claim 1 wherein said pump tube is removably attached to said filter basket.

3. The brewing assembly as claimed in claim 2 further comprising a bushing; wherein said filter basket comprises a central opening and wherein said bushing is attached to said pump tube such that said bushing frictionally engages said central opening of said filter basket.

4. The brewing assembly as claimed in claim 2 wherein said filter basket comprises a central opening and wherein brewing said pump tube further comprises an oblong portion dimensioned to frictionally engage said central opening of said filter basket.

5. A coffee percolator comprising:
   a container comprising a bottom, a top, an exterior surface, an interior surface for holding water and brewed coffee, a pouring spout in communication with said interior surface, and a top opening disposed through said top; and
   a brewing assembly removably disposed within said container, said brewing assembly comprising;
   a filter basket comprising an open top, a perforated bottom, an inner surface, and an outer surface;
   a substantially hollow pump tube attached to said filter basket and dimensioned to extend from a point proximate to the bottom of the container to a position above said filter basket, wherein said pump tube is attached to said filter basket such that said pump tube is removed when said filter basket is removed from the container; and a cover comprising a top, a handle extending from said top, and an open bottom defined by a sidewall, wherein said sidewall of said cover comprises means for engaging said container such that said cover remains attached to said container when said container is tipped to pour coffee through said pouring spout, and means for engaging said filter basket such that said brewing assembly remains attached to said cover when said cover is removed from said container after coffee is brewed.

6. The coffee percolator as claimed in claim 5 wherein said container comprises at least one first engaging detail disposed upon said interior surface proximate to said top opening;

wherein said filter basket comprises at least one second engaging detail disposed upon said outer surface thereof;

wherein said means for engaging said container comprises at least one first detent extending outward from said sidewall of said cover and dimensioned to mate with and engage said first engaging detail of said container; and wherein said means for engaging said filter basket comprises at least one second detent extending inward from said sidewall and dimensioned to mate with and engage said second mating detail of said filter basket.

7. The coffee percolator as claimed in claim 5 wherein said at least one first engaging detail comprises a ring annularly disposed about said inside surface of said container.

8. The coffee percolator as claimed in claim 5 wherein said at least one second engaging detail comprises a ring annularly disposed about said outer surface of said filter basket.

9. The coffee percolator as claimed in claim 6 wherein said at least one first detent comprises two outward detents disposed in substantially opposed relation upon said sidewall of said cover and wherein said second detent comprises two inward detents disposed in substantially opposed relation upon said sidewall of said cover.

10. The coffee percolator as claimed in claim 8 wherein said two inward detents are disposed in substantially opposing relation about said cover and wherein and said inward detents and said ring are dimensioned such that said cover may be disengaged from said filter basket by placing said pump tube on a surface and tilting said cover.

11. The coffee percolator as claimed in claim 5 wherein said pump tube is removably attached to said filter basket.

12. The coffee percolator as claimed in claim 10 further comprising a bushing; wherein said filter basket comprises a central opening and wherein bushing is attached to said pump tube such that said bushing frictionally engages said central opening of said filter basket.

13. The coffee percolator as claimed in claim 10 wherein said filter basket comprises a central opening and wherein brewing said pump tube further comprises an oblong portion dimensioned to frictionally engage said central opening of said filter basket.

14. The coffee percolator as claimed in claim 5 further comprising a dripping basket disposed within said open top of said filter basket.

15. The brewing assembly as claimed in claim 5 further comprising a dripping basket disposed within said open top of said filter basket.

16. A brewing assembly for a coffee percolator comprising a container having a bottom, a top, an exterior surface, an interior surface for holding water and brewed coffee, a pouring spout in communication with the interior surface, and a top opening disposed through the top, said brewing assembly comprising:

at least one basket comprising an open top, a perforated bottom, an inner surface, and an outer surface, wherein one of said at least one basket is a filter basket;

a substantially hollow pump tube attached to said filter basket and dimensioned to extend from a point proximate to the bottom of the container to a position above said filter basket, wherein said pump tube is attached to said filter basket such that said pump tube is removed when said filter basket is removed from the container; and a cover comprising a top, a handle extending from said top, and an open bottom defined by a sidewall, wherein said cover comprises means for engaging the container such that said cover remains attached to the container when said container is tipped to pour coffee through said pouring spout, and means for engaging at least one basket such that said brewing assembly remains attached to said cover when said cover is removed from the container after coffee is brewed;

wherein said means for engaging at least one basket comprises a spring disposed within said cover, said spring comprising at least two arms extending downward along said sidewall of said cover and inward to engage at least one basket.

17. The brewing assembly as claimed in claim 16:

wherein said at least one basket comprises a filter basket and a dripping basket;

wherein said dripping basket is disposed within said open top of said filter basket and engages said filter basket such that said filter basket is removed when said dripping basket is removed from the container;

wherein said spring of said means for engaging at least one basket comprises at least two arms extending downward along said sidewall of said cover and inward to engage at least one of said dripping basket and said filter basket; and wherein said substantially hollow pump tube is dimensioned to extend from a point proximate to the bottom of the container to a position above said dripping basket.

18. The brewing assembly as claimed in claim 16 wherein said pump tube is removably attached to said filter basket.

19. The brewing assembly as claimed in claim 18 further comprising a bushing; wherein said filter basket comprises a central opening and wherein said bushing is attached to said pump tube such that said bushing frictionally engages said central opening of said filter basket.

20. The brewing assembly as claimed in claim 18 wherein said filter basket comprises a central opening and wherein brewing said pump tube further comprises an oblong portion dimensioned to frictionally engage said central opening of said filter basket.

* * * * *